US012163481B2

(12) United States Patent
Dudar

(10) Patent No.: US 12,163,481 B2
(45) Date of Patent: Dec. 10, 2024

(54) VEHICLE AND CORRESPONDING FUEL SYSTEM

(71) Applicant: FORD GLOBAL TECHNOLOGIES, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 18/160,604

(22) Filed: Jan. 27, 2023

(65) Prior Publication Data

US 2024/0254936 A1 Aug. 1, 2024

(51) Int. Cl.
*F02D 41/00* (2006.01)
*F02M 25/08* (2006.01)

(52) U.S. Cl.
CPC ....... *F02D 41/004* (2013.01); *F02M 25/0809* (2013.01); *F02M 25/0836* (2013.01); *F02M 25/0854* (2013.01); *F02M 2025/0881* (2013.01)

(58) Field of Classification Search
CPC .............. F02D 41/004; F02M 25/0809; F02M 25/0836; F02M 25/0854; F02M 2025/0881
See application file for complete search history.

(56) References Cited

U.S. PATENT DOCUMENTS

| | | | | |
|---|---|---|---|---|
| 3,693,825 A * | 9/1972 | Richman | B60K 15/03504 | 220/227 |
| 4,880,135 A * | 11/1989 | Neou | B65D 90/38 | 220/721 |
| 5,746,186 A * | 5/1998 | Kidokoro | B60K 15/03 | 137/587 |
| 7,980,228 B2 * | 7/2011 | Peters | F02M 25/0872 | 123/518 |
| 8,671,916 B2 * | 3/2014 | Ogaki | F02M 25/089 | 123/518 |
| 9,488,136 B2 * | 11/2016 | Pearce | F02M 25/0809 | |
| 11,274,622 B1 * | 3/2022 | Dudar | F02D 41/22 | |
| 11,346,308 B1 * | 5/2022 | Dudar | F02M 25/0818 | |
| 11,754,012 B1 * | 9/2023 | Dudar | F02M 25/0836 | 73/114.43 |
| 2010/0294251 A1 * | 11/2010 | Makino | F02M 37/20 | 123/519 |
| 2011/0139130 A1 * | 6/2011 | Siddiqui | F02M 25/0818 | 123/520 |
| 2016/0361992 A1 * | 12/2016 | Aso | G01N 25/00 | |

* cited by examiner

*Primary Examiner* — Phutthiwat Wongwian
*Assistant Examiner* — Susan E Scharpf
(74) *Attorney, Agent, or Firm* — Vincent Mastrogiacomo; Brooks Kushman P.C.

(57) ABSTRACT

A vehicle includes a fuel tank, a canister, a heater, a bellows, and a valve. The fuel tank is configured to store fuel. The canister is configured to receive and store evaporated fuel from the fuel tank. The heater disposed within the canister. The bellows is disposed within the fuel tank. The bellows is configured to regulate the pressure within the fuel tank. The valve is configured to isolate an internal volume of the bellows from the canister when in a first position. The valve is configured to establish fluid communication between the internal volume of the bellows and the canister when in a second position.

19 Claims, 4 Drawing Sheets

VEHICLE AND CORRESPONDING FUEL SYSTEM

TECHNICAL FIELD

The present discloser relates to fuel systems for vehicles.

BACKGROUND

Vehicles may include fuel systems that are configured to deliver fuel from a fuel tank to an internal combustion engine.

SUMMARY

A vehicle includes an engine, a fuel tank, a canister, a canister purge valve, a heater, a bellows, a bellows vent valve, and a controller. The engine is configured to propel the vehicle. The fuel tank is configured to store fuel. The canister is in fluid communication with the fuel tank and is configured to receive and store evaporated fuel from the fuel tank during a refueling event. The canister purge valve is disposed between the canister and the engine. The canister purge valve is configured to open to direct the evaporated fuel from the canister to the engine upon initiating an operating cycle of the engine. The heater is disposed within the canister. The bellows is disposed within the fuel tank and is configured to regulate the pressure within the fuel tank. The bellows vent valve is configured to establish fluid communication between an internal volume of the bellows and ambient surroundings when in a first position. The bellows vent valve is configured to establish fluid communication between the internal volume of the bellows and the canister when in a second position. The controller is programmed to, in response to anticipation of the refueling event, transition the bellows vent valve to the second position, activate the heater, and direct heated air from the canister to the internal volume of the bellows.

A vehicle includes a fuel tank, a canister, a heater, a bellows, a valve, and a controller. The fuel tank is configured to store fuel. The canister is in fluid communication with the fuel tank. The canister is configured to receive and store evaporated fuel from the fuel tank. The heater disposed within the canister. The bellows is disposed within the fuel tank. The bellows is configured to regulate the pressure within the fuel tank. The valve is configured to isolate an internal volume of the bellows from the canister when in a first position. The valve is configured to establish fluid communication between the internal volume of the bellows and the canister when in a second position. The controller is programmed to, in response to scheduling of a refueling event, transition the valve to the second position, activate the heater, and direct heated air from the canister to the internal volume of the bellows prior to the scheduled refueling event.

A vehicle includes a fuel tank, a canister, a heater, a bellows, conduits and a valve. The canister is configured to receive and store evaporated fuel from the fuel tank during a refueling event. The heater is disposed within the canister. The bellows is disposed within the fuel tank. The bellows is configured to regulate the pressure within the fuel tank. The conduits establish fluid communication between an internal volume of the bellows and the canister. The conduits also establish fluid communication between the internal volume of the bellows and the ambient surroundings. The valve is disposed along the conduits. The valve is configured to facilitate fluid communication between the internal volume of the bellows and the ambient surroundings when in a first position. The valve is also configured to isolate the internal volume of the bellows from the canister when in the first position. The valve is configured to facilitate fluid communication between the internal volume of the bellows and the canister when in a second position. The valve is also configured to isolate the internal volume of the bellows from ambient surroundings when in the first position.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
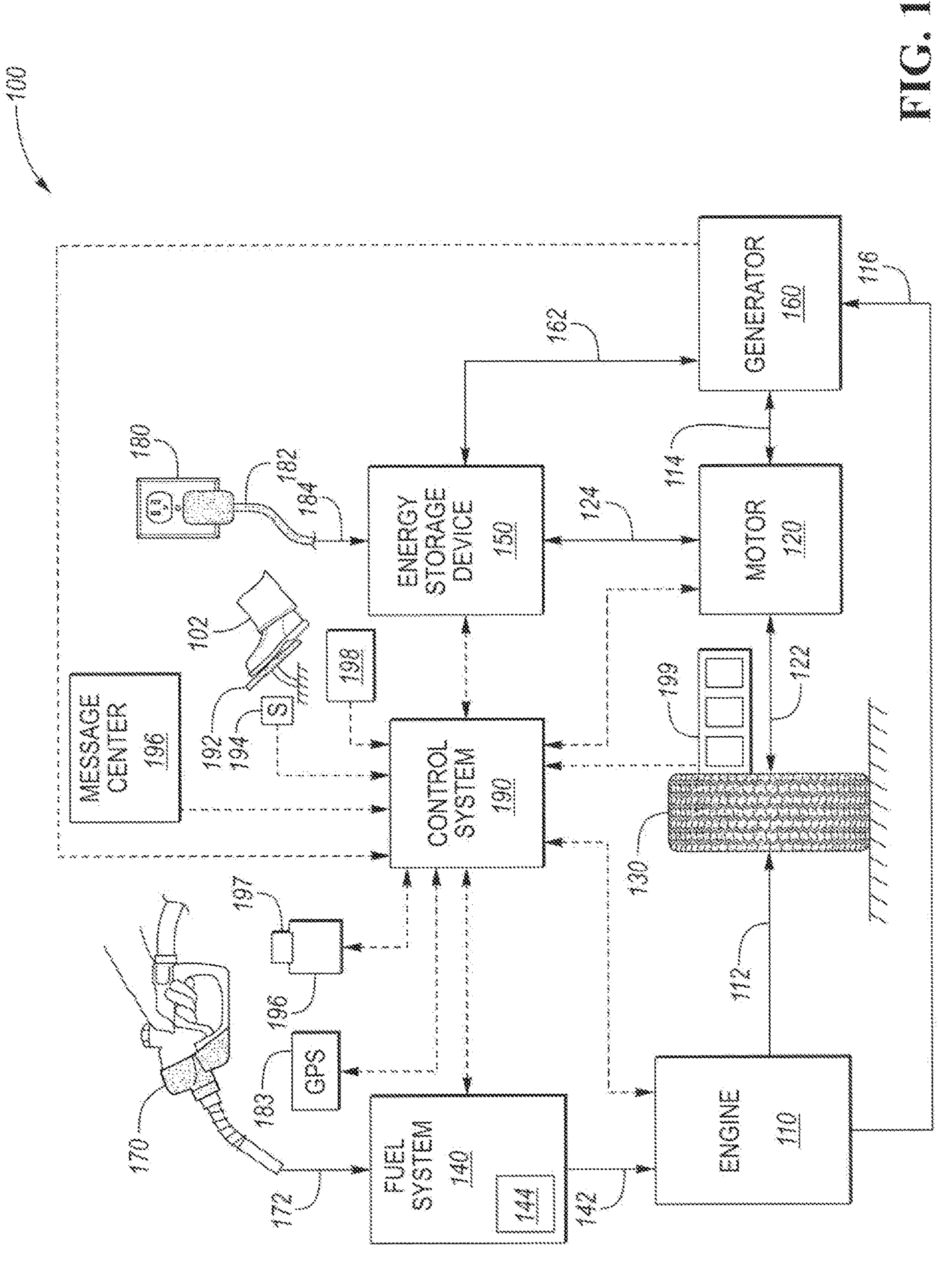
FIG. 1 is a schematic illustration of a vehicle propulsion system.

FIG. 1 illustrates an example vehicle propulsion system 100. Vehicle propulsion system 100 includes a fuel burning engine 110 and a motor 120, each of which may be configured to generate power to propel the vehicle. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122, where the motor may convert the kinetic energy of the vehicle to electrical energy for storage at energy storage device 150 as indicated by arrow 124. This operation may be referred to as regenerative braking of the vehicle. Thus, motor 120 may provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 configured for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

The fuel tank 144 may be a sealed pressure-less non-integrated refueling canister-only systems (NIRCOS) fuel tank including a built-in variable volume device (e.g., a bellows) that expands and contracts to relieve vacuum and pressure buildups. The bellows may change size to maintain the fuel tank at atmospheric pressure. By maintaining the fuel tank at atmospheric pressure, unsealing of the fuel tank during a refueling request may be expedited without the additional time needed for venting of the tank in a pressurized NIRCOS fuel tank.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of the engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling switch or button 197 which may be manually, activated, actuated, or pressed by a vehicle operator to initiate refueling, in anticipation of a refueling event, or to schedule a refueling event. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Figure 2:
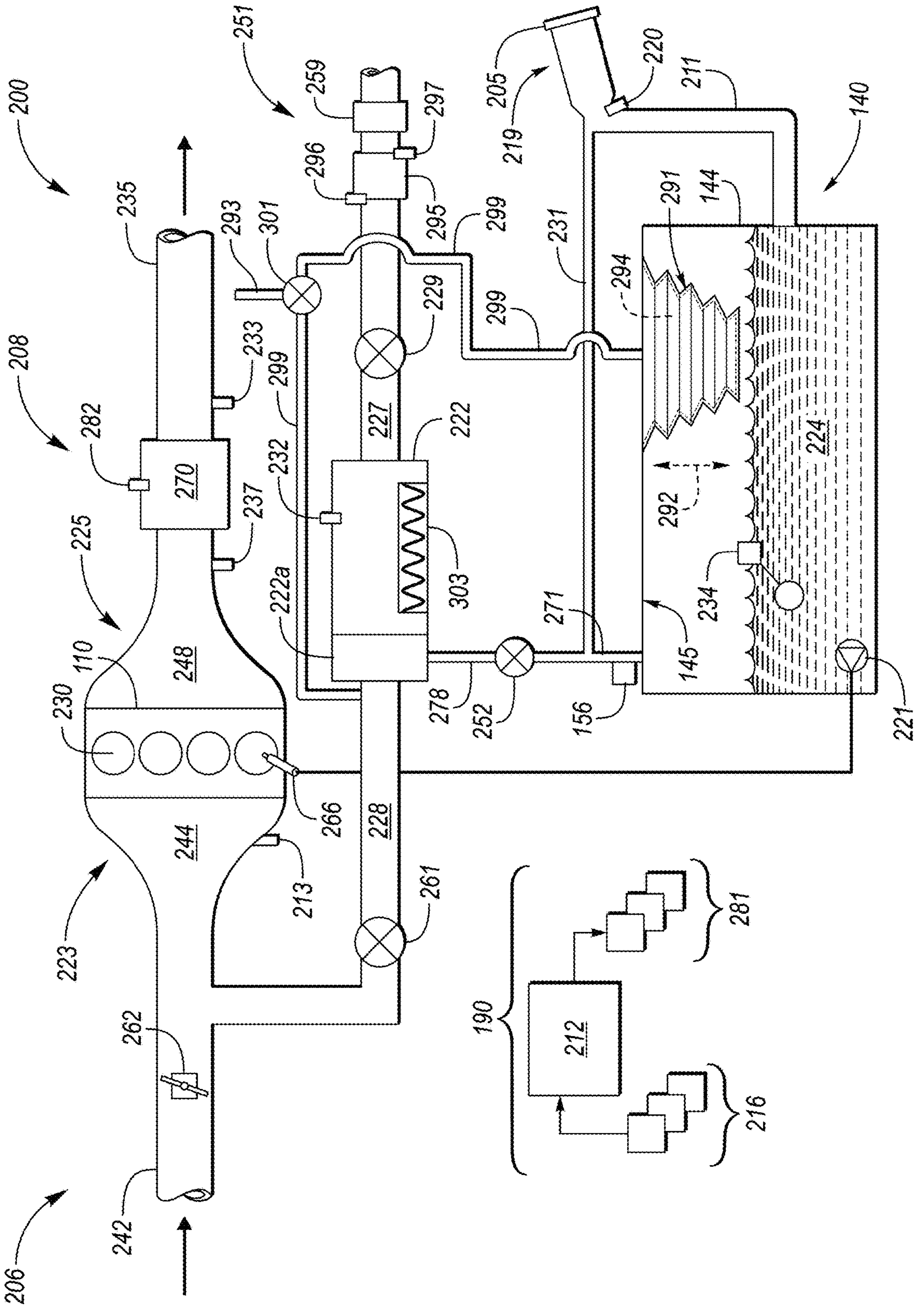
FIG. 2 is a schematic illustration of a vehicle and a fuel system for the vehicle.

Referring now to FIG. 2, a schematic diagram 200 depicting a vehicle system 206 is shown. In some examples, vehicle system 206 may be an HEV system, such as a PHEV system. For example, vehicle system 206 may be the same as vehicle propulsion system 100 of FIG. 1. However, in other examples, vehicle system 206 may be implemented in a non-hybrid vehicle (e.g., a vehicle equipped with an engine and without a motor operable to at least partially propel the vehicle).

Vehicle system 206 may include an engine system 208 coupled to each of a fuel evaporative emissions control system 251 and fuel system 140. The fuel evaporative emissions control system 251 may be referred to as the fuel evaporative system. Engine system 208 may include engine 110 having a plurality of cylinders 230. Engine 110 may include an engine air intake system 223 and an engine exhaust system 225. Engine air intake system 223 may include a throttle 262 in fluidic communication with an engine intake manifold 244 via an intake passage 242. Further, engine air intake system 223 may include an air box and filter (not shown) positioned upstream of throttle 262. Engine exhaust system 225 may include an exhaust manifold 248 leading to an exhaust passage 235 that routes exhaust gas to the atmosphere. Engine exhaust system 225 may include an emission control device 270, which in one example may be mounted in a close-coupled position in exhaust passage 235 (e.g., closer to engine 110 than an outlet of exhaust passage 235) and may include one or more exhaust catalysts. For instance, emission control device 270 may include one or more of a three-way catalyst, a lean nitrogen oxide (NOx) trap, a diesel particulate filter, an oxidation catalyst, etc. In some examples, an electric heater 282 may be coupled to emission control device 270, and utilized to heat emission control device 270 to or beyond a predetermined temperature (e.g., a light-off temperature of emission control device 270).

It will be appreciated that other components may be included in engine system 208 such as a variety of valves and sensors. For example, a barometric pressure sensor 213 may be included in engine air intake system 223. In one example, barometric pressure sensor 213 may be a manifold air pressure (MAP) sensor and may be coupled to engine intake manifold 244 downstream of throttle 262. Barometric pressure sensor 213 may rely on part throttle or full or wide open throttle conditions, e.g., when an opening amount of throttle 262 is greater than a threshold, in order to accurately determine a barometric pressure.

Fuel system 140 may include fuel tank 144 coupled to a fuel pump system 221. Fuel pump system 221 may include one or more pumps for pressurizing fuel delivered to cylinders 230 via fuel injectors 266 during a single cycle of cylinders 230 (while only a single fuel injector 266 is shown at FIG. 2, additional fuel injectors may be provided for each cylinder 230). A distribution or relative amounts of fuel delivered, injection timing, etc. may vary with operating conditions such as engine load, engine knock, exhaust temperature, etc. responsive to different operating or degradation states of fuel system 140, engine 110, etc. A pressure in the fuel system may be estimated via a fuel tank pressure transducer (FTPT) 156. In one example, the FTPT 156 may be included within the fuel tank 144.

Fuel system 140 may be a return-less fuel system, a return fuel system, or any one of various other types of fuel system. Fuel tank 144 may hold a fuel 224 including a plurality of fuel blends, e.g., fuel with a range of alcohol portions, such as gasoline, various gasoline-ethanol blends (including E10, E85), etc. A fuel level sensor 234 disposed in fuel tank 144 may provide an indication of the fuel level ("Fuel Level Input") to a controller 212 included in control system 190. As depicted, fuel level sensor 234 may include a float coupled to a variable resistor. Alternatively, other types of fuel level sensors may be used.

Vapors (e.g., fuel evaporate) generated in fuel system 140 may be routed to evaporative emissions control system 251 via vapor recovery line 231, before being purged to engine air intake system 223. Vapor recovery line 231 may be coupled to fuel tank 144 via one or more conduits. For example, vapor recovery line 231 may be coupled to fuel tank 144 via at least one conduit 271.

Evaporative emissions control system 251 may further include one or more fuel vapor containers or canisters 222 for capturing and storing fuel vapors. Stated in other terms, the one or more fuel vapor containers or canisters 222 may be configured to receive and store evaporated fuel from the fuel tank 144 during operation of the vehicle, non-operation of the vehicle, or during a refueling event. Fuel vapor canister 222 may be coupled to and in fluid communication with fuel tank 144 via at least one conduit 278 including at least one fuel tank isolation valve (FTIV) 252 for isolating the fuel tank during certain conditions. For example, during engine operation, FTIV 252 may be kept closed to limit the amount of diurnal or "running loss" vapors directed to canister 222 from fuel tank 144. During refueling operations and selected purging conditions, FTIV 252 may be temporarily opened, e.g., for a duration, to direct fuel vapors from the fuel tank 144 to canister 222. Further, FTIV 252 may also be temporarily opened when the fuel tank pressure is higher than a threshold (e.g., above a mechanical pressure limit of the fuel tank), such that fuel vapors may be released into the canister 222 and the fuel tank pressure is maintained below the threshold.

In some examples, vapor recovery line 231 may be coupled to a fuel tank refilling or refueling system 219. In some examples, refueling system 219 may include a fuel cap 205 for sealing off the refueling system from the atmosphere. Refueling system 219 may be coupled to fuel tank 144 via a fuel filler pipe or neck 211. In some examples, fuel filler pipe 211 may include a flow meter sensor 220 operable to monitor a flow of fuel being supplied to fuel tank 144 via the fuel filler pipe (e.g., during refueling).

During refueling, fuel cap 205 may be manually opened or may be automatically opened responsive to a refueling request received at controller 212. A fuel dispensing device (e.g., 170) may be received by, and thereafter fluidically coupled to, refueling system 219, whereby fuel may be supplied to fuel tank 144 via fuel filler pipe 211. Refueling may continue until the fuel dispensing device is manually shut off or until fuel tank 144 is filled to a threshold fuel level (e.g., until feedback from fuel level sensor 234 indicates the threshold fuel level has been reached), at which point a mechanical or otherwise automated stop of the fuel dispensing device may be triggered.

Evaporative emissions control system 251 may include one or more emissions control devices, such as fuel vapor canister 222 filled with an appropriate adsorbent, the fuel vapor canister being configured to temporarily trap fuel vapors (including vaporized hydrocarbons) during refueling operations. In one example, the adsorbent used may be activated charcoal. Evaporative emissions control system 251 may further include a canister ventilation path or vent line 227 which may route gases out of fuel vapor canister 222 to the atmosphere when storing, or trapping, fuel vapors from fuel system 140.

Fuel vapor canister 222 may include a buffer **222*a* (or buffer region), each of the fuel vapor canister and the buffer including the adsorbent. As shown, a volume of buffer 222*a* may be smaller than (e.g., a fraction of) a volume of fuel vapor canister 222. The adsorbent in buffer 222*a* may be the same as, or different from, the adsorbent in fuel vapor canister 222 (e.g., both may include charcoal). Buffer 222*a* may be positioned within fuel vapor canister 222 such that, during canister loading, fuel tank vapors may first be adsorbed within the buffer, and then when the buffer is saturated, further fuel tank vapors may be adsorbed in a remaining volume of the fuel vapor canister. In comparison, during purging of fuel vapor canister 222, fuel vapors may first be desorbed from the fuel vapor canister (e.g., to a threshold amount) before being desorbed from buffer 222*a*. In other words, loading and unloading of buffer 222*a* may not be linear with loading and unloading of fuel vapor canister 222. As such, one effect of buffer 222*a* is to dampen any fuel vapor spikes flowing from fuel tank 144 to fuel vapor canister 222, thereby reducing a possibility of any fuel vapor spikes going to engine 110**.

In some examples, one or more temperature sensors 232 may be coupled to and/or within fuel vapor canister 222. As fuel vapor is adsorbed by the adsorbent in fuel vapor canister 222, heat may be generated (heat of adsorption). Likewise, as fuel vapor is desorbed by the adsorbent in fuel vapor canister 222, heat may be consumed. In this way, the adsorption and desorption of fuel vapor by fuel vapor canister 222 may be monitored and estimated based on temperature changes within the fuel vapor canister.

Vent line 227 may also allow fresh air to be drawn into fuel vapor canister 222 when purging stored fuel vapors from fuel system 140 to engine air intake system 223 via purge line 228 and canister purge valve 261. For example, purge valve 261 may normally be closed but may be opened during certain conditions so that vacuum from engine intake manifold 244 may be provided to fuel vapor canister 222 for purging. For example, purge value 261 may be opened after a refueling event to direct the evaporated fuel from the canister 222 to the engine 110 upon initiating a new operating cycle of the engine 110. Purge valve 261 is disposed between the fuel vapor canister 222 and engine 110. In some examples, vent line 227 may further include an air filter 259 disposed therein downstream of fuel vapor canister 222.

Flow of air and vapors between fuel vapor canister 222 and the atmosphere may be regulated by a canister vent valve 229. Canister vent valve 229 may be a normally open valve, so that FTIV 252 may control venting of fuel tank 144 with the atmosphere. As described above, FTIV 252 may be positioned between fuel tank 144 and fuel vapor canister 222 within conduit 278. In a NIRCOS fuel system, the FTIV 252 may be a normally closed valve, that when opened during conditions such as refueling, allows for venting of fuel vapors from fuel tank 144 to fuel vapor canister 222. FTIV 252 may also be opened upon the pressure in the fuel tank 144 increasing to a threshold pressure. Fuel vapors may then be vented to atmosphere via canister vent valve 229, or purged to engine air intake system 223 via canister purge valve 261.

In some examples, evaporative emissions control system 251 may further include an evaporative level check monitor (ELCM) 295. ELCM 295 may be disposed in vent line 227 and may be configured to control venting and/or assist in detection of undesired evaporative emissions. As an example, ELCM 295 may include a vacuum pump for applying negative pressure to the fuel system 140 and/or evaporative emissions control system 251 when administering a test for undesired evaporative emissions. Such a test may be referred to as a fuel evaporate system leak test, which may include the vacuum pump evacuating the canister 222 and corresponding components of the evaporative emissions control system 251 during the fuel evaporate system leak test. In some embodiments, the vacuum pump may be configured to be reversible. In other words, the vacuum pump may be configured to apply either a negative pressure or a positive pressure on the evaporative emissions control system 251 and fuel system 140. ELCM 295 may further include a reference orifice (not shown), a pressure sensor 297, and a changeover valve (COV) 296. A reference check may thus be performed whereby a vacuum may be drawn across the reference orifice, where the resulting vacuum level comprises a vacuum level indicative of an absence of undesired evaporative emissions. For example, following the reference check, the fuel system 140 and evaporative emissions control system 251 may be evacuated by the ELCM vacuum pump. In the absence of undesired evaporative emissions, the vacuum may pull down to the reference check vacuum level. Alternatively, in the presence of undesired evaporative emissions, the vacuum may not pull down to the reference check vacuum level.

During select engine and/or vehicle operating conditions, such as after an emission control device light-off temperature has been attained (e.g., a threshold temperature reached after warming up from ambient temperature) and with the engine running, the controller 212 may control the ELCM 295 changeover valve (COV) 296 to enable fuel vapor canister 222 to be fluidically coupled to atmosphere. For example, ELCM COV 296 may be configured in a first position (e.g. opened), where the first position includes the fuel vapor canister 222 fluidically coupled to atmosphere, except during pressure tests performed on the system. In one example, under natural aspiration conditions (e.g. intake manifold vacuum conditions), ELCM COV 296 may be configured in a second position (e.g. closed) to seal the fuel vapor canister 222 from atmosphere. By commanding ELCM COV 296 to the second position, the evaporative emissions control system 251 and fuel system 140 may be evacuated in order to ascertain the presence or absence of undesired evaporative emissions.

Figure 3A:
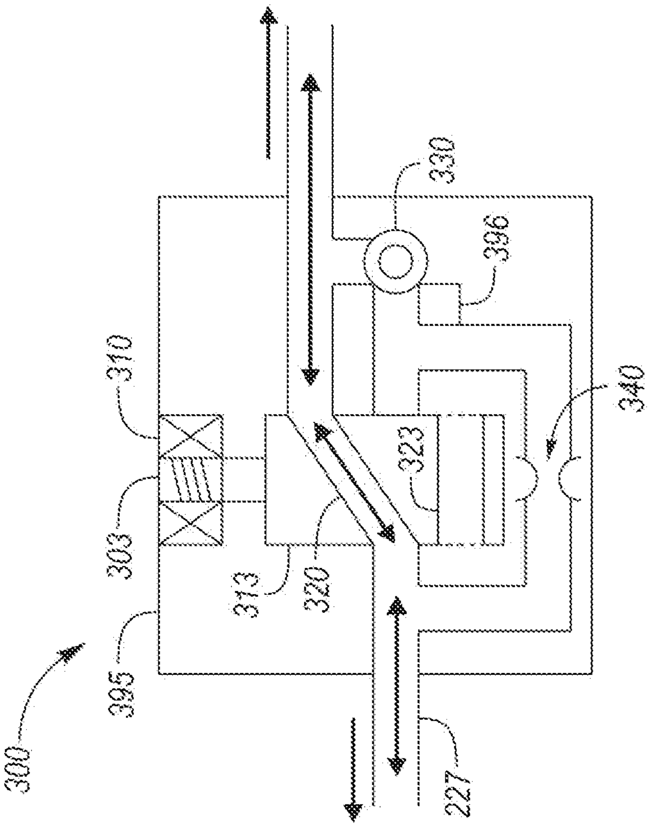
FIG. 3A is a schematic depiction of the evaporative leak check module in a configuration where a fuel vapor canister is vented to the atmosphere.
Figure 3B:
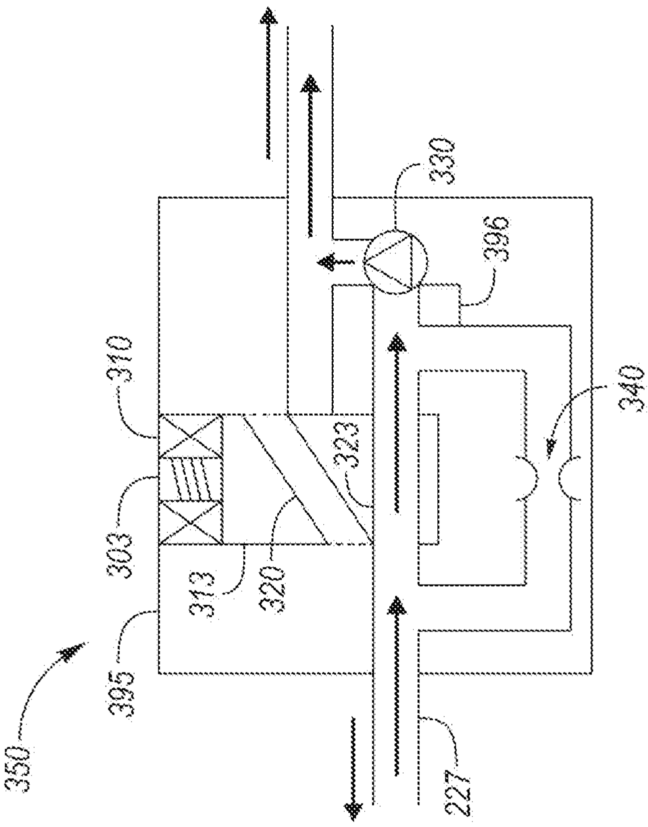
FIG. 3B is a schematic depiction of the evaporative leak check module in a configuration where air is directed from the atmosphere to the fuel vapor canister.

Undesired evaporative emission detection routines may be intermittently performed by controller 212 on fuel system 140 to confirm that the fuel system is not degraded. As such, undesired evaporative emission detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, undesired evaporative emission detection routines may be performed while the engine is running by operating a vacuum pump and/or using engine intake manifold vacuum. Undesired evaporative emission tests may be performed by the ELCM 295 communicatively coupled to controller 212. ELCM 295 may further include a reference orifice. Following the application of vacuum to the fuel system, a change in pressure at the reference orifice (e.g., an absolute change or a rate of change) may be monitored via the pressure sensor 297, and compared to a threshold. Based on the comparison, undesired evaporative emissions from the fuel system may be identified. The ELCM vacuum pump may be a reversible vacuum pump, and thus configured to apply a positive pressure to the fuel system when a bridging circuit is reversed placing the pump in a second conformation. Example positions of the ELCM pump are shown in FIGS. 3A, 3B.

Fuel system 140 may be a non-integrated refueling canister-only system (NIRCOS), in that fuel tank 144 may be substantially isolatable from fuel vapor canister 222 such that fuel vapors in fuel tank 144 and fuel vapor canister 222 may be independently controlled as desired (e.g., during refueling). During periods in which fuel tank 144 is fluidically decoupled from fuel vapor canister 222, a fuel vapor pressure may develop within the fuel tank. Accordingly, venting and depressurization control routines are often implemented for NIRCOS fuel tanks, along with structural reinforcement thereof. For example, a given NIRCOS may include numerous valves and venting lines coupled to fuel tank(s) included therein to ensure that any excess fuel vapor pressure is properly evacuated or redistributed. Further, NIRCOS fuel tanks may be constructed of high tensile-strength material, such as heavy steel, and configured with a plurality of standoffs therein, the plurality of standoffs extending between opposing walls of a given NIRCOS fuel tank, such that greater fuel vapor pressures may be withstood without fuel tank degradation.

As an alternative, fuel system 140 may include a bellows 291. The bellows 291 is configured to regulate a pressure of the fuel and/or fuel evaporate (e.g., fuel vapors) within the fuel tank 144. More specifically, the bellows 291 may be configured to maintain a fuel vapor pressure of fuel tank 144 at, or near, atmospheric pressure. As such, complex structural configurations for managing excess fuel vapor pressure may be obviated. Specifically, bellows 291 may be disposed within and affixed to an upper surface 145 of fuel tank 144. The bellows may include collapsible sections with may expand and collapse based on pressure in the fuel tank and within the bellows.

As shown in FIG. 2, the fuel level of fuel 224 in fuel tank 144 may be entirely below bellows 291, such that the (liquid) fuel may not be physically contacting the bellows and the bellows may be in a maximally expanded configuration. As the bellows 291 is contacted by rising fuel 224 during refueling, the bellows may compress along an axis 292 proportionally with an increase in the fuel level in fuel tank 144 (up until the bellows reaches a maximally compressed configuration). During compression, air within bellows 291 may be evacuated through vapor lines or conduits 299 and to the atmosphere or ambient surrounds via the atmospheric port 293. More specifically, an internal volume 294 of the bellows 291 is in fluid communication with the conduits 299 and the atmospheric port 293 via the conduits 299, and the internal volume 294 may be evacuated of air via the conduits 299 and atmospheric port 293. After refueling and during engine operation, fuel 224 may be provided to engine 110 via actuation of fuel pump system 221, such that the fuel level in fuel tank 144 may fall and bellows 291 may expand proportionally along axis 292 (up until the bellows again attains the maximally expanded configuration). During expansion, a pressure differential may be generated between bellows 291 and the surrounding environment such that air may be induced into the bellows via the conduits 299 and atmospheric port 293.

In this way, a variable volume configuration may be provided to fuel tank 144 via expansion and contraction of bellows 291, such that a fuel vapor pressure of the fuel tank may be maintained within a threshold range of a predetermined pressure (e.g., an ambient pressure of the surrounding environment). In some examples, the fuel vapor pressure of fuel tank 144 may be maintained within the threshold range even across widely varying ambient temperatures, such as between 40 and 95° F. As such, fuel tank 144 may be formed from materials having relatively weaker strength compared to NIRCOS fuel tanks described above and including fewer or no standoffs therein. Further, a more simplified configuration of valves and lines may be included in fuel system 140 relative to other NIRCOSs, as complex depressurization/venting routines may be obviated by the presence of bellows 291.

The internal volume 294 of the bellows 291 may also be in fluid communication with the purge line 228 of the evaporative emissions control system 251 via conduits 299 to establish fluid communication between the bellows 291 and the fuel vapor canister 222. The atmospheric port 293 may branch from the conduits 299 at a position that is between the purge line 228 (or fuel vapor canister 222) and the bellows 291.

A bellows vent valve 301 is disposed along the atmospheric port 293. The bellows vent valve 301 may be configured to establish or facilitate fluid communication between the internal volume 294 of the bellows 291 and the ambient surroundings or atmosphere via the atmospheric port 293 when in a first position. The bellows vent valve 301 may also be configured to isolate the internal volume 294 of the bellows 291 from the purge line 228 and the fuel vapor canister 222 when in the first position. The bellows vent valve 301 may also be configured to establish or facilitate fluid communication between the internal volume 294 of the bellows 291 and the fuel vapor canister 222 via the purge line 228 when in a second position. The bellows vent valve 301 may also be configured to isolate the internal volume 294 of the bellows 291 from the ambient surroundings or atmosphere via the atmospheric port 293 when in the second position. The bellows vent valve 301 may be a three-port valve.

Fuel system 140 may be operated by controller 212 in a plurality of modes by selective adjustment of the various valves (e.g., responsive to the various sensors). For example, fuel system 140 may be operated in a refueling mode (e.g., when refueling is requested by a vehicle operator), wherein controller 212 may close FTIV 252 and transition bellows vent valve 301 to the first position allowing bellows 291 to maintain the fuel vapor pressure of fuel tank 144 within the threshold range of the predetermined pressure. However, if bellows 291 is compressed to the maximally compressed configuration, and the fuel vapor pressure begins increasing beyond which is manageable by fuel tank 144 (e.g., when the fuel tank becomes undesirably overfilled), fuel system 140 may be operated in a venting mode. In the venting mode, controller 212 may open FTIV 252 and canister vent valve 229, while maintaining canister purge valve 261 closed, to direct refueling vapors into fuel vapor canister 222 while preventing fuel vapors from being directed into engine intake manifold 244 (and thus provide a venting path for fuel vapors). As such, opening FTIV 252 may allow refueling vapors to be stored in fuel vapor canister 222. After refueling is completed, at least FTIV 252 may be closed once again.

As another example, the fuel system may be operated in a canister purging mode (e.g., after a given emission control device light-off temperature has been attained and with engine 110 running), wherein controller 212 may open canister purge valve 261 and canister vent valve 229 while closing FTIV 252. Herein, the vacuum generated by engine intake manifold 244 of (operating) engine 110 may be used to draw fresh air through vent line 227 and through fuel vapor canister 222 to purge stored fuel vapors into engine intake manifold 244. As such, in the canister purging mode, the purged fuel vapors from fuel vapor canister 222 may be combusted in engine 110. The canister purging mode may be continued until an amount or level of stored fuel vapors in fuel vapor canister 222 are below a threshold amount or level.

Control system 190, including controller 212, is shown receiving information from a plurality of sensors 216 (various examples of which are described herein) and sending control signals to a plurality of actuators 281 (various examples of which are described herein). As one example, sensors 216 may include one or more of exhaust gas sensor 237 located upstream of emission control device 270 in exhaust passage 235, temperature sensor 233 located downstream of emission control device 270 in exhaust passage 235, flow meter sensor 220 located in fuel filler pipe 211, fuel level sensor 234 located in fuel tank 144, temperature sensor 232 located in fuel vapor canister 222, FTPT 156, and ELCM pressure sensor 297. Other sensors such as pressure, temperature, air/fuel ratio, and composition sensors may be coupled to various locations in vehicle system 206. As an additional or alternative example, actuators 281 may include fuel injector 266, throttle 262, FTIV 252, canister purge valve 261, canister vent valve 229, and bellows vent valve 301 of the fuel system, and ELCM COV 296. Controller 212 may receive input data from sensors 216, process the input data, and trigger actuators 281 in response to the processed input data based on instructions or code programmed in non-transitory memory therein, the instructions or code corresponding to one or more control routines.

One or more heating elements or canister heaters 303 may be coupled to and/or disposed within the fuel vapor canister 222. The canister heaters 303 may be used to selectively heat the fuel vapor canister 222 (and the adsorbent contained within) for example, to increase desorption of fuel vapors prior to performing a purge operation. The canister heaters 303 may comprise an electric heating element, such as a conductive metal, ceramic, or carbon element that may be heated electrically, such as a thermistor. In some embodiments, the canister heaters 303 may comprise a source of microwave energy, or may comprise a canister jacket coupled to a source of hot air or hot water. The canister heaters 303 may be coupled to one or more heat exchangers that may facilitate the transfer of heat, (e.g., from hot exhaust) to fuel vapor canister 222. The canister heaters 303 may be configured to heat air within the fuel vapor canister 222, and/or to directly heat the adsorbent located within fuel vapor canister 222. In some embodiments, the canister heaters 303 may be included in a heater compartment coupled to the interior or exterior of fuel vapor canister 222. In some embodiments, the fuel vapor canister 222 may be coupled to one or more cooling circuits, and/or cooling fans. In this way, fuel vapor canister 222 may be selectively cooled to increase adsorption of fuel vapors (e.g., prior to a refueling event). In some examples, the fuel vapor canister 222 may comprise one or more Peltier elements, which may be configured to selectively heat or cool the fuel vapor canister 222. The canister heaters 303 may be in communication with and controlled by the controller 212 or control system 190.

FIG. 3A shows a first schematic depiction 300 of the evaporative leak check module (ELCM) 395 in a first configuration where a fuel vapor canister (such as canister 222 in FIG. 2) of the evaporative emissions control system is vented to atmosphere. FIG. 3B shows a second schematic depiction 350 of the ELCM 395 in a second configuration. The ELCM 395 in FIGS. 3A,B may be the ELCM 295 in FIG. 2

ELCM 395 includes a changeover valve (COV) 313, a vacuum pump 330, and a pressure sensor 396. Vacuum pump 330 may be a reversible pump, for example, a vane pump. COV 313 may be moveable between a first and a second position. In the first position, as shown in FIG. 3A, air may flow through ELCM 395 via first flow path 320. In the second position, as shown in FIG. 3B, air may flow through ELCM 395 via second flow path 323. The position of COV 313 may be controlled by solenoid 310 via compression spring 303. ELCM 395 may also comprise reference orifice 340. Reference orifice 340 may have a diameter corresponding to the size of a threshold leak to be tested, for example, 0.02". In either the first or second position, pressure sensor 396 may generate a pressure signal reflecting the pressure within ELCM 395. Operation of pump 330 and solenoid 310 may be controlled via signals received from controller 212.

As shown in FIG. 3A, in the first configuration, COV 313 is in the first position, and pump 330 is deactivated. This configuration allows for air to freely flow between atmosphere and the canister via first flow path 320. This configuration may be used during a canister purging operation, for example, or during other conditions where the fuel vapor canister is to be vented to atmosphere. Upon receiving a request for refueling, the COV 313 may be actuated to the first position (first position of ELCM), to facilitate air flow through the fuel vapor canister 222 and venting of the refueling vapor from the fuel tank to the fuel vapor canister 222.

As shown in FIG. 3B, COV 313 is in the second position, and pump 330 is activated in a first direction. This configuration allows pump 330 to draw a vacuum on fuel system 140 via vent line 227. In examples where fuel system 140 includes FTIV 252, FTIV 252 may be opened to allow pump 330 to draw a vacuum on fuel tank 144. Air flow through ELCM 395 in this configuration is represented by arrows. In this configuration, as pump 330 pulls a vacuum on fuel system 140, the absence of undesired evaporative emissions from the system should allow for the vacuum level in ELCM 395 to reach or exceed the previously determined vacuum threshold using reference orifice 340. In the presence of an evaporative emissions system breach larger than the reference orifice, the pump will not pull down to the reference check vacuum level, and undesired evaporative emissions may be indicated. As previously stated, the pump 330 may be reversed to direct air from the atmosphere and toward the fuel vapor canister 222.

In this way, the components of FIGS. 1-3A, 3B enable a system for a vehicle, comprising: a variable volume device disposed within a fuel tank, an atmospheric port of the variable volume device fluidly coupled to a vent line upstream of a leak detection module (ELCM) of an evaporative emissions control (EVAP) system via a vapor line, the vent line coupling a fuel vapor canister of the EVAP to atmosphere, and a controller with computer-readable instructions stored on non-transitory memory which when executed cause the controller to: fluidically couple a pump of the ELCM to the variable volume device via the vapor line, operate the pump to evacuate the variable volume device over a threshold duration, and indicate the variable volume device as robust or degraded based on a first pressure estimated via an ELCM pressure sensor and a second pressure estimated via a fuel tank pressure sensor. The variable volume device may be indicated to be robust in response to the first pressure reducing to a threshold pressure within the threshold duration, and the variable volume device may be indicated to be degraded in response to the first pressure not reducing to the threshold pressure within the threshold duration and a change in the second pressure following a change in the first pressure.

While illustrated as one controller, the controller 212 or control system 190 described herein may be part of a larger control system and may be controlled by various other controllers throughout the vehicle, such as a vehicle system controller (VSC). It should therefore be understood that the control system 190 and one or more other controllers can collectively be referred to as a "controller" that controls various actuators in response to signals from various sensors to control functions the vehicle or vehicle subsystems. The control system 190 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the control system 190 in controlling the vehicle or vehicle subsystems.

Control logic or functions performed by the controller 212 or control system 190 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as control system 190. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Plug-in hybrid vehicles typically have a sealed fuel tank. The FTIV valve 252 is normally closed and the fuel tank 144 is typically made of heavy steel to withstand pressures and vacuum builds from diurnal temperature cycles. When the fuel tank 144 is sealed, the canister 222 may be sized to adsorb refueling and depressurization vapors only, while running loss and diurnal vapors are contained inside the fuel tank. This type of system is called NIRCOS (Non Integrated Refueling Canister Only System). Additionally, fuel doors on vehicle have a locking solenoid to prevent operator from opening a pressurized fuel tank and being sprayed with fuel vapor.

Typically, to refuel a plug-in hybrid vehicle, a dash mounted switch (e.g., switch 197) is pressed to indicate to the controller of desire to refuel. The controller strategy monitors the pressure/vacuum inside the tank and opens the FTIV 252 to vent the fuel tank 144. Only when fuel tank pressure is near atmosphere is the fuel door unlocked to allow refueling. This protects the operator from getting sprayed with fuel mist. The high pressure FTPT sensor 156 is used to measure the pressure inside the tank 144 and infer that fuel tank 144 is depressurized for refueling. In hot climates, significant pressures can build up inside the fuel tank 144. Hence the depressurization time can be long. Customers, however, expect to fuel the vehicle as if they are fueling a regular gas vehicle with minimal delays. Ideally, when customer steps out of the car, the fuel door should open to allow the customer to refuel. Also, additional hardware and software are needed to seal and depressurize such a fuel tank during a refueling event. A fuel tank with an internal bellows reduces the time to depressurize. However, internal bellows inside fuel tanks may become stiff and less pliable during cold climates, resulting in refueling issues.

A "pressure-less" fuel tank is sealed to prevent diurnal and running loss vapors from loading the canister. Hence it still qualifies as a "NIRCOS" fuel tank. However, the fuel tank has a built-in bellows that expands and contracts to relieve vacuum and pressure buildups. Hence such a fuel tank uses variable geometry to maintain internal pressure at atmospheric condition. The pressure-less fuel tank system requires less hardware and software than a pressurized system. The pressure-less fuel tank, however, has bellows which may consist of plastic materials. Plastics tend to become rigid in cold climates and not easily deformable. Also, if moist air enters the bellows via the atm port at the top of the bellows, it can freeze and cause bellows to be stuck in an expanded position, which may result in limiting the capacity of the fuel tank to receive fuel. To facilitate a quality refueling event that fills the fuel tank to its maximum rated capacity, preheating the bellows when ambient temperatures fall below a threshold may be advantageous.

Fuel canisters maybe equipped with internal heaters to facilitate better purging as heat forces heavy end hydrocarbons to desorb inside the canister. With traditional fuel tanks, the path between the fuel tank and canister is open and vapors are almost always loading the canister as it is being purged. With hybrid vehicles, the fuel tank is typically sealed. Thus, once the canister is cleaned out, it may remain clean until the next refueling event. A clean canister is an enabler for the for the method 400 described herein, since is desirable to force air into the bellows and not fuel vapor. The canister heater may be used to warm up the flexible bellows during cold ambient temperatures. Refueling events are deterministic in typical hybrid vehicles as a customer pulls up to gas station, they must press a dash mounted button to vent the fuel tank (open the FTIV).

On the other hand, when the vehicle approaches a gas station as monitored by GPS coordinates and/or if the fuel level is low, the method 400 described herein turns on the canister heater. A three-port valve is utilized to control the flow of heated air from the canister to the bellows. In the default state, the three-port valve is adjusted to allow the bellows to communicate to the atmosphere so that the bellows can expand and contract as designed. Prior to refueling in cold ambient temperatures, the canister heater is turned on. After a specified period of time, the ELCM pump that is used for leak detection is turned on and heated air is pumped toward the bellows by adjusting the three-port valve so that the canister is in fluid communication with the bellows. Some on-board diagnostic pumps are pressure based, while others are vacuum based. The ELCM pump is a vacuum pump. Hence an H-bridge is used to reverse polarize it and force it to become a pressure-based pump. This is needed to push heated air out of the canister and into the bellows. Forced heated air enters the bellows and makes the material more pliable. After a specified period time, the ELCM pump is turned off, the three-port valve is returned to default state (i.e., the three-port valve is adjusted to allow the bellows to communicate to atmosphere) and FTIV is opened, thus allowing the refueling to begin. Preheating the bellows prior to refueling results in a better refueling allowing the fuel tank receive fuel at full capacity. If bellows is stuck in an expanded position and does not collapse due cold or freezing, the fuel tank filling capacity decreases and customer's drive range also decreases.

Figure 4:
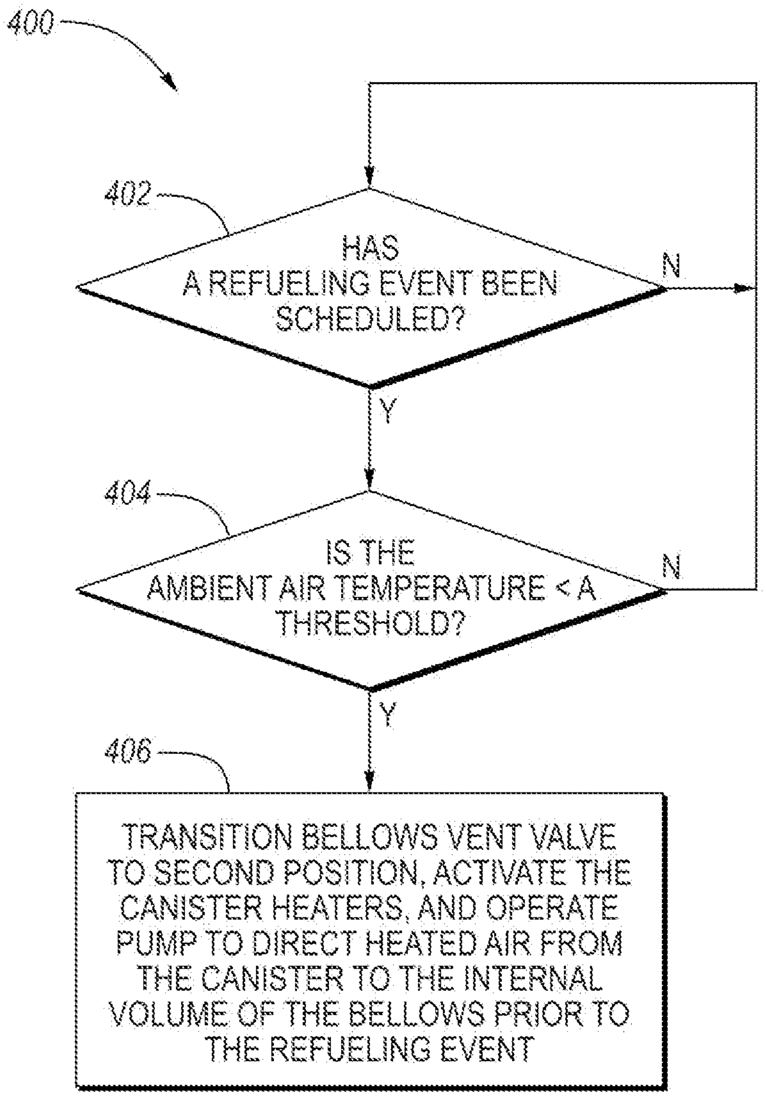
FIG. 4 is a flowchart illustrating a method for heating a pressure-controlling bellows that is disposed within a fuel tank of the fuel system prior to a refueling event.

Referring to FIG. 4, a flowchart illustrating a method 400 for heating the bellows 291 is illustrated. The method 400 may be stored as control logic and/or an algorithm within a controller (e.g., control system 190 or controller 212). The method 400 begins at block 402, where it is determined if a refueling event (e.g., an event where the fuel 144 tank will be filled with additional fuel) has been scheduled or a refueling event is being anticipated. The refueling event may be scheduled or anticipated in response to an operator activating a refueling button or switch (e.g., refueling switch or button 197), a location of the vehicle being within a predetermined proximity or distance of a gas station, the vehicle turning into a gas station, or a fuel level within the fuel tank 144 being less than a threshold. Alternatively, the scheduling or anticipating of the refueling event may require correlation between several factors. For Example, scheduling or anticipating the refueling event may require both (i) the vehicle being within a predetermined proximity or distance of a gas station and (ii) the fuel level within the fuel tank 144 being less than a threshold.

The vehicle may include a global positioning system 183 (See FIG. 1) that communicates the location of the vehicle to the controller (e.g., control system 190 or controller 212). The global positioning system 183 may include maps and other data that includes the location of gas stations. The controller may then correlate the position of the vehicle to the gas station locations.

If a refueling event has not been scheduled or anticipated, the method 400 recycles back to the beginning of block 402. If the refueling event has been scheduled or anticipated, the method 400 moves on to block 404, where it is determined if the ambient air temperature is less than a threshold. A sensor may be utilized to determine the ambient air temperature. The sensor may communication the ambient air temperature to the controller. If the ambient temperature is not less than the threshold, the method 400 recycles back to the beginning of block 402. If the ambient temperature is less than the threshold, the method 400 move on to the block 406.

At block 406 the bellows vent valve 301 is transitioned to the second position, the one or more canister heaters 303 are activated, and the vacuum pump 330 is operated in reverse to direct heated air from the fuel vapor canister 222 to the internal volume 294 of the bellows 291. More specifically, at block 406 the vacuum pump 330 is operated to (i) direct air from the ambient surroundings to the fuel vapor canister 222 such that the one or more canister heaters 303 heat the air and (ii) direct the heated air from the fuel vapor canister 222 to the internal volume 294 of the bellows 291. The ELCM 395 may be in the second configuration (i.e., FIG. 3B) when the vacuum pump 330 is operated in reverse at block 406, however, air flow will be in the opposite direction than what is shown in FIG. 3B (i.e., the air will flow from the atmosphere to the vacuum pump 330 and from the vacuum pump 330 toward the fuel vapor canister 222 via vent line 227). The canister purge valve 261 may also be closed at block 400 so that the heated air flowing out of the fuel vapor canister 222 does not also flow toward the engine 110 via purge line 228 but only flows toward the internal volume 294 of the bellows 291 via conduits 299.

It should be understood that the flowchart in FIG. 4 is for illustrative purposes only and that the method 400 should not be construed as limited to the flowchart in FIG. 4. Some of the steps of the method 400 may be rearranged while others may be omitted entirely. It should further be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an engine configured to propel the vehicle;
a fuel tank configured to store fuel;
a canister in fluid communication with the fuel tank and configured to receive and store evaporated fuel from the fuel tank during a refueling event;
a canister purge valve (i) disposed between the canister and the engine and (ii) configured to open to direct the evaporated fuel from the canister to the engine upon initiating an operating cycle of the engine;
a heater disposed within the canister;
a bellows (i) disposed within the fuel tank and (ii) configured to regulate pressure within the fuel tank;
a bellows vent valve configured to (i) establish fluid communication between an internal volume of the bellows and ambient surroundings when in a first position and (ii) establish fluid communication between the internal volume of the bellows and the canister when in a second position; and
a controller programmed to, in response to anticipation of the refueling event, (i) transition the bellows vent valve to the second position, (ii) activate the heater, and (iii) direct heated air from the canister to the internal volume of the bellows.

2. The vehicle of claim 1, wherein the anticipation of the refueling event corresponds to an operator activating a refueling switch.

3. The vehicle of claim 1, wherein the anticipation of the refueling event corresponds to a location of the vehicle within a predetermined proximity of a gas station.

4. The vehicle of claim 1, wherein the anticipation of the refueling event corresponds to a fuel level within the fuel tank being less than a threshold.

5. The vehicle of claim 1 further comprising a pump, and wherein the controller is further programmed to, in response to anticipation of the refueling event, operate the pump to (i) direct air from the ambient surrounding to the canister such that heater heats the air and (ii) direct the heated air from the canister to the internal volume of the bellows.

6. The vehicle of claim 5, wherein the pump is a vacuum pump configured to evacuate the canister and corresponding fuel evaporative system components during a fuel evaporate system leak test.

7. The vehicle of claim 6, wherein the controller is programmed to, in response to anticipation of the refueling event, operate the pump in reverse.

8. The vehicle of claim 1, wherein controller is further programmed to, in response to anticipation of the refueling event, transition or maintain the canister purge valve to or in a closed position.

9. A vehicle comprising:
a fuel tank configured to store fuel;
a canister in fluid communication with the fuel tank and configured to receive and store evaporated fuel from the fuel tank;
a heater disposed within the canister;
a bellows (i) disposed within the fuel tank and (ii) configured to regulate pressure within the fuel tank;
a valve configured to (i) isolate an internal volume of the bellows from the canister when in a first position and (ii) establish fluid communication between the internal volume of the bellows and the canister when in a second position; and
a controller programmed to, in response to scheduling of a refueling event, (i) transition the valve to the second position, (ii) activate the heater, and (iii) direct heated air from the canister to the internal volume of the bellows prior to the scheduled refueling event.

10. The vehicle of claim 9, wherein scheduling of the refueling event corresponds to an operator activating a refueling switch.

11. The vehicle of claim 9, wherein the scheduling of the refueling event corresponds to a location of the vehicle within a predetermined proximity of a gas station.

12. The vehicle of claim 9, wherein the scheduling of the refueling event corresponds to a fuel level within the fuel tank being less than a threshold.

13. The vehicle of claim 9 further comprising a pump, and wherein the controller is further programmed to, in response to scheduling of the refueling event, operate the pump to (i) direct air from ambient surroundings to the canister such that heater heats the air and (ii) direct the heated air from the canister to the internal volume of the bellows.

14. The vehicle of claim 13, wherein the pump is a vacuum pump configured to evacuate the canister and corresponding fuel evaporative system components during a fuel evaporate system leak test.

15. The vehicle of claim 14, wherein the controller is programmed to, in response to scheduling of the refueling event, operate the pump in reverse.

16. The vehicle of claim 9, wherein the valve configured to establish fluid communication between the internal volume of the bellows and ambient surroundings when in the first position.

17. The vehicle of claim 9 further comprising an engine and a canister purge valve, wherein the canister purge valve is (i) disposed between the canister and the engine and (ii) configured to open to direct the evaporated fuel from the canister to the engine upon initiating an operating cycle of the engine after the refueling event.

18. The vehicle of claim 17, wherein controller is further programmed to, in response to scheduling of the refueling event, transition or maintain the canister purge valve to or in a closed position.

19. A vehicle comprising:
a fuel tank;
a canister configured to receive and store evaporated fuel from the fuel tank during a refueling event;
a heater disposed within the canister;
a bellows (i) disposed within the fuel tank and (ii) configured to regulate pressure within the fuel tank;
conduits (i) establishing fluid communication between an internal volume of the bellows and the canister and (ii) establishing fluid communication between the internal volume of the bellows and ambient surroundings;
a valve disposed along the conduits and configured to (i) facilitate fluid communication between the internal volume of the bellows and the ambient surroundings when in a first position, (ii) isolate the internal volume of the bellows from the canister when in the first position, (iii) facilitate fluid communication between the internal volume of the bellows and the canister when in a second position, and (iv) isolate the internal volume of the bellows from the ambient surroundings when in the second position; and a controller programmed to, in response to scheduling of the refueling event and an ambient temperature being less than a threshold, (i) transition the valve to the second position, (ii) activate the heater, and (iii) direct heated air from the canister to the internal volume of the bellows prior to the scheduled refueling event.

* * * * *